United States Patent [19]

Koyama et al.

[11] Patent Number: 5,093,193
[45] Date of Patent: Mar. 3, 1992

[54] MAGNETIC RECORDING MEDIUM AND METHOD OF MAKING IT

[75] Inventors: Noboru Koyama; Setsuko Kawahara; Yasushi Nakano, all of Hino, Japan

[73] Assignee: Konica Corporation, Tokyo, Japan

[21] Appl. No.: 498,327

[22] Filed: Mar. 23, 1990

[30] Foreign Application Priority Data

Mar. 31, 1989 [JP] Japan .................................. 1-82980

[51] Int. Cl.$^5$ .............................................. G11B 23/00
[52] U.S. Cl. .................... 428/336; 428/694; 428/900
[58] Field of Search .................. 428/694, 900, 336

[56] References Cited

U.S. PATENT DOCUMENTS 4,980,230 12/1990 Saito et al. ........................ 428/900

Primary Examiner—Paul J. Thibodeau
Attorney, Agent, or Firm—Jordan B. Bierman

[57] ABSTRACT

A magnetic recording medium and its manufacturing method are disclosed. The medium comprises a non-magnetic support and, provided thereon, a first magnetic layer coated by a first magnetic coating solution and a second magnetic layer coated by a second magnetic coating solution in this order, wherein a dry thickness of the first magnetic layer represented by $\mu m$, $t_1$, a dry thickness of the second magnetic layer represented by $\mu m$, $t_2$, the solid content of the first magnetic coating solution represented by weight %, $W_1$, and the solid content of the second magnetic coating solution represented by weight %, $W_2$ have the following relation, $$2.0 \leq (t_1/W_1)/(t_2/W_2) \leq 15.0$$

12 Claims, 2 Drawing Sheets

MAGNETIC RECORDING MEDIUM AND METHOD OF MAKING IT

FIELD OF THE INVENTION

The present invention relates to a magnetic recording medium such as a magnetic tape, a magnetic sheet or a magnetic disk, and a method of making the medium.

BACKGROUND OF THE INVENTION

In general, magnetic recording mediums such as magnetic tapes are prepared by applying to a support a magnetic coating solution comprising a magnetic powder, a binder resin and so forth, followed by drying.

In recent years, in magnetic recording mediums used for video recording that particularly requires short-wave recording, a medium having a plurality of magnetic layers has been proposed, which are provided so that the magnetic recording capacity can be increased or the magnetic recording performances in both the high frequency region and low frequency region of the medium can be improved and balanced {see Japanese Patent Publication Open to Public Inspection (hereinafter referred to as Japanese Patent O.P.I. Publication) No. 98803/1973, Japanese Patent O.P.I. Publication No. 172142/1984, Japanese Patent Examined Publication No. 2218/1957, Japanese Patent O.P.I. Publication No. 64901/1976, Japanese Patent Examined Publication No. 12937/1981, etc.}.

In such conventional mediums, however, no satisfactory conditions have been found when an upper magnetic layer must be formed with good surface characteristics on account of the influence of a lower magnetic layer or the correlation in the coating conditions for the upper and lower magnetic layers must be determined in order to make appropriate the surface characteristics of the medium to achieve a high output and a high S/N ratio. As a result, in some instances the medium may be so excessively mirror-surfaced that the rubbing noise may increase in the course of its travel or that the C/N ratio (carrier-to-noise ratio) may be excessively lowered in the case when the surface of the medium is rough.

SUMMARY OF THE INVENTION

An object of the present invention is to provide a magnetic recording medium having good surface characteristics, and also to provide a method of making such a medium.

The present invention provides a magnetic recording medium comprising a non-magnetic support and, provided thereon, a first magnetic layer coated with a first magnetic coating solution and a second magnetic layer coated with a second magnetic coating solution in this order, wherein a dry thickness of the first magnetic layer represented by $\mu m$, $t_1$, a dry thickness of the second magnetic layer represented by $\mu m$, $t_2$, the solid content of the first magnetic coating solution represented by weight %, $W_1$, and the solid content in said second magnetic coating solution represented by weight %, $W_2$ have the following relation, $$2.0 \leq (t_1/W_1)/(t_2/W_2) \leq 15.0.$$

The present invention also provides a method of manufacturing a magnetic recording medium comprising coating, on a non-magnetic support, a first magnetic layer with a first magnetic coating solution and a second magnetic layer with a second magnetic coating solution in this order, wherein a dry thickness of the first magnetic layer represented by $\mu m$, $t_1$, a dry thickness of the second magnetic layer represented by $\mu m$, $t_2$, the solid content of the first magnetic coating solution represented by weight %, $W_1$, and the solid content in said second magnetic coating solution represented by weight %, $W_2$ have the following relation, $$2.0 \leq (t_1/W_1)/(t_2/W_2) \leq 15.0.$$

DETAILED DESCRIPTION OF THE INVENTION

The present inventors made various studies on magnetic recording mediums having a plurality of magnetic layers as described above. As a result, they have discovered that the problems conventionally involved as discussed above can be well eliminated when the ratio of a dry coating thickness of a first magnetic layer (lower layer) to the solid content of a first magnetic coating solution and the ratio of a dry coating thickness of a second magnetic layer (upper layer) to the solid content of a second magnetic coating solution satisfies a given relationship between the respective layers. The above ratio can be individually determined at the time the respective layers are formed by coating. It, however, has been found that it is difficult to obtain the desired surface characteristics if the ratio is independently determined for each layer and therefore it is indispensable for the ratio to be determined in a relative manner between the layers. They thus have reached the conclusion that the magnetic coating solutions must be applied within the above range of the present invention, i.e., $2.0 \leq (t_1/W_1)/(t_2/W_2) \leq 15.0$.

More specifically, if $(t_1/W_1)/(t_2/W_2)$ is less than 2.0, the surface of the medium is excessively mirror-surfaced and smoothened because of a relatively too thin lower magnetic layer or a relatively too high concentration of a solid in the coating solution therefor (stated conversely, because of a relatively too thick upper magnetic layer or a relatively too low concentration of a solid in the coating solution therefor), resulting in an extremely large rubbing noise. On the other hand, if $(t_1/W_1)/(t_2/W_2)$ is more than 15.0, the surface of the medium tends to become rough because of a relatively too thick lower magnetic layer or a relatively too low concentration of a solid in the coating solution therefor (stated conversely, because of a relatively too thin upper magnetic layer or a relatively too high concentration of a solid in the coating solution therefor), resulting in an extreme lowering of the characteristics such as output (for example, a lowering of C/N ratio). Hence, it is essential and indispensable for the $(t_1/W_1)/(t_2/W_2)$ to range from 2.0 to 15.0, in order to simultaneously satisfy the contradictory characteristics such as rubbing noise and C/N ratio. This is the range that has been discovered for the first time by the present inventors as a result of their repeated studies. In a more preferred embodiment, this range should be from 5.0 to 10.0.

Figure 1:
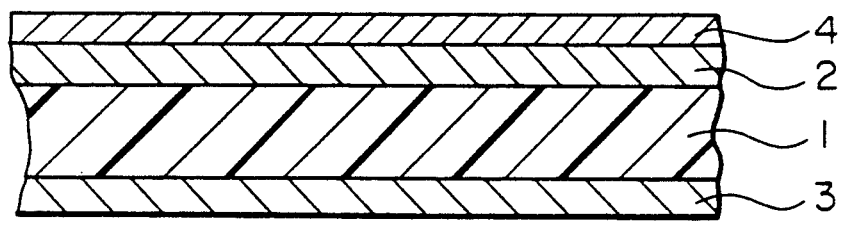
FIG. 1 is a cross section of an example of magnetic recording mediums.

As FIG. 1 shows, the magnetic recording medium of the present invention comprises, for example, a non-magnetic support 1 made of polyethylene terephthalate or the like, and a first magnetic layer 2 and a second magnetic layer 4 which are superimposed on the support in this order. A back coat layer 3 is also provided on the support surface opposite to the surface on which the above layers are superimposed. This layer, however, may not necessarily be provided. On the second magnetic layer, an overcoat layer may be provided.

In the magnetic recording medium as shown in FIG. 1, the first magnetic layer may preferably have a dry coating thickness of from 1.5 to 4.0 $\mu$m. The second magnetic layer may preferably have a dry coating thickness of not more than 1.0 $\mu$m, and particularly from 0.3 to 1.0 $\mu$m.

The first and second magnetic layers 2 and 4 contain magnetic powders. Such magnetic powders include various ferromagnetic powders as exemplified by iron oxide magnetic powders such as $\gamma$-$Fe_2O_3$, Co-containing $\gamma$-$Fe_2O_3$, $Fe_3O_4$, and Co-containing $Fe_3O_4$; and metal magnetic powders mainly composed of Fe, Ni and/or Co, such as powder of Fe, Ni, Co, an Fe-Ni-Co alloy, an Fe-Ni alloy, an Fe-Al alloy, an Fe-Al-Ni alloy, an Fe-Al-Co alloy, an Fe-Mn-Zn alloy, an Fe-Ni-Zn alloy, an Fe-Al-Ni-Co alloy, an Fe-Al-Ni-Cr alloy, an Fe-Al-Co-Cr alloy, an Fe-Co-Ni-Cr alloy, an Fe-Co-Ni-P alloy, or a Co-Ni alloy.

Of these magnetic powders, suitable powder may be selected for the above magnetic layers 2 and 4. For example, in the upper layer 4, a powder with a coersive force (Hc) higher than that of the lower layer 2 may be used to give a medium with a high output and good frequency characteristics.

Lubricants as exemplified by silicone oil, graphite, molybdenum disulfide, tungsten disulfide, a monobasic fatty acid having 12 to 20 carbon atoms, such as stearic acid, and an ester of a fatty acid having 13 to 40 carbon atoms, abrasives as exemplified by fused alumina, and antistatic agents as exemplified by carbon black and graphite may also be added in the magnetic layers.

Binders that can be used in the magnetic layers 2 and 4 may preferably include those having an average molecular weight of from about 10,000 to about 200,000, as exemplified by vinyl chloride/vinyl acetate copolymer, vinyl chloride/vinylidene chloride copolymer, vinyl chloride/acrylonitrile copolymer, urethane resins, butadiene/acrylonitrile copolymer, polyamide resins, polyvinyl butyral, cellulose derivatives such as cellulose acetate butylate, cellulose diacetate, cellulose triacetate, cellulose propionate and nitrocellulose, styrene/butadiene copolymer, polyester resins, various types of synthetic rubbers, phenol resins, epoxy resins, urea resins, melamine resins, phenoxy resins, silicone resins, acrylic reactive resins, a mixture of high-molecular polyester resin and isocyanate prepolymer, a mixture of polyester polyol and polyisocyanate, urea formaldehyde resins, a mixture of low-molecular glycol, high-molecular diol and isocyanate, and mixtures of some of these.

These binders may preferably be resins containing a hydrophilic polar group such as $-SO_3M$, $-COOM$, $-PO(OM')_2$, wherein M represents an alkali metal such as lithium, potassium or sodium, and M' represents hydrogen, an alkali metal such as lithium, potassium or sodium, or a hydrocarbon residual group. Namely, such resins can improve compatibility with the magnetic powders because of the polar group present in the molecule, thereby further improving dispersibility of the magnetic powders. They can also prevent agglomeration of the magnetic powders, more improving the coating solution stability, and moreover making it possible to improve the durability of the medium.

Such binders, in particular, vinyl chloride copolymers, can be obtained by copolymerizing vinyl chloride monomer with copolymerizable monomer containing an alkali salt of sulfonic acid or phosphoric acid, and other copolymerizable monomers optionally used. These copolymers are polymerized by addition polymerization and hence can be synthesized with ease. At the same time, the copolymerization components can be variously selected, and hence the copolymer can be controlled to have optimum properties.

The metal in the above-mentioned salt of sulfonic acid or phosphoric acid is an alkali metal particularly including sodium, potassium and lithium. The potassium is particularly preferred in view of the solubility, reactivity, yield, etc.

The magnetic coating solution according to the present invention is prepared by dispersing magnetic powders, binders or other additives described above in a solvent. The solvent used includes methyl ethyl ketone, cyclohexanone, toluene or xylene.

In the case when the back coat layer 3 is provided, the above binder is incorporated with non-magnetic particles such as barium sulfate, and the resulting composition is applied to the back of the support.

Materials that are used for the above support 1 include plastics such as polyethylene terephthalate and polypropylene, metals such as Al and Zn, and ceramics such as glass, BN, silicon carbide, porcelain and earthenware.

Figure 2:
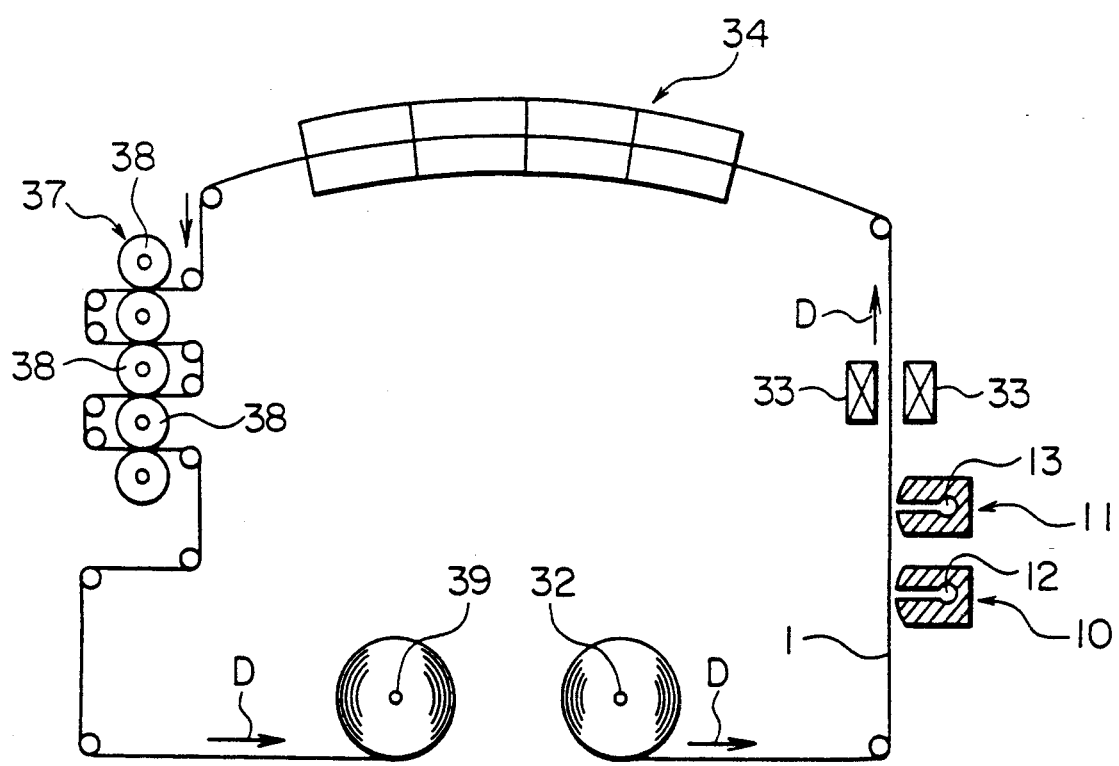
FIG. 2 is a schematic illustration of an apparatus for making a magnetic recording medium.

FIG. 2 shows an example of the apparatus for working the method of making the medium described above.

In this apparatus, a film-like support 1 fed from a feed roll 32 is coated with the respective magnetic coating solutions for the magnetic layers 2 and 4 by means of extrusion coaters 10 and 11, respectively, in the manner as previously described. Thereafter, the magnetic layers are oriented with an orienting magnet 33. The support with the magnetic layers thus oriented is led into a dryer 34, where it is dried by the blowing of hot air from nozzles provided above and below it. Next, the support 1 with the coating layers thus dried is guided to a calendering section 37 comprised of a combination of calendering rolls 38, where it is calendered, and thereafter wound up to a wind-up roll 39. The respective coating solutions may be fed to the extrusion coaters 10 and 11 through a in-line mixer (not shown). In FIG. 2, the letter D indicates the direction to which the non-magnetic base film is transported. The extrusion coaters 10 and 11 are provided with liquid reservoirs 12 and 13, respectively, and the coating solutions from the respective coaters are overlapped by the wet-on-wet system.

EXAMPLES

The present invention will be described below in greater detail by giving Examples.

The components, proportions, order of operations can be varied so long as they may not deviate from the concept or intention of the present invention. In the following examples, "part(s)" is part(s) by weight in all instances.

Preparation of video tapes

The following magnetic coating solutions or coating solutions for conductive layers were first prepared.

| | |
|---|---|
| Magnetic coating solution A for upper layer | 100 parts |
| Co-γ-Fe₂O₃ | |
| (Hc = 900 Oe; average major axis length: 0.2 μm) | |
| Vinyl chloride resin containing potassium sulfonate | 10 parts |
| (MR110; a product of Nippon Zeon Co., Ltd.) | |
| Polyurethane resin | 5 parts |
| (XE-1; a product of Takeda Chemical Industries, Ltd.) | |
| α-Al₂O₃ (average particle diameter: 0.2 μm) | 6 parts |
| Carbon black | 1 part |
| Myristic acid | 1 part |
| Stearic acid | 1 part |
| Butyl stearate | 1 part |
| Colonate L | 5 parts |
| (a product of Nippon Polyurethane Industry Co., Ltd.) | |
| (Subtotal: | 130 parts) |
| (A) Methyl ethyl ketone | |
| (B) Cyclohexanone | |
| (C) Toluene | |
| (A) + (B) + (C) (1:1:1 ratio) | X parts in total |

Solid content $W_2$ (wt.%) = 130/(130+X) × 100
where X represents the parts by weight that give the values $W_2$ shown in Table 1.

| | |
|---|---|
| Magnetic coating solution B for lower layer | 100 parts |
| Co-γ-Fe₂O₃ | |
| (Hc = 700 Oe; average major axis length: | 0.25 μm) |
| Vinyl chloride resin containing potassium sulfonate | 10 parts |
| (MR110; a product of Nippon Zeon Co., Ltd.) | |
| Polyurethane resin | 5 parts |
| (XE-1; a product of Takeda Chemical Industries, Ltd.) | |
| Myristic acid | 1 part |
| Stearic acid | 1 part |
| Butyl stearate | 1 part |
| Colonate L | 5 parts |
| (a product of Nippon Polyurethane Industry Co., Ltd.) | |
| (Subtotal: | 123 parts) |
| (A) Methyl ethyl ketone | |
| (B) Cyclohexanone | |
| (C) Toluene | |
| (A) + (B) + (C) (1:1:1 ratio) | Y parts in total |

Solid content $W_1$ (wt.%) = 123/(123+Y) × 100
where Y represents the parts by weight that give the values $W_1$ shown in Table 1.

Next, on a polyethylene terephthalate base film of 14.5 μm in thickness, the magnetic coating solution B for the lower layer and the magnetic coating solution A for the upper layer were successively applied in the way as shown in Table 1, followed by orientation, drying, and then calendering.

Thereafter, a back coat layer coating solution with the following composition was applied to the surface opposite to the side on which the magnetic layers are provided, so as to give a dry thickness of 0.4 μm.

| | |
|---|---|
| Carbon black (Raven 1035) | 40 parts |
| Barium sulfate (average particle diameter: 300 μm) | 10 parts |
| Nitrocellulose | 25 parts |
| N-2301 (a product of Nippon Polyurethane Industry Co., Ltd.) | 25 parts |
| Colonate (a product of Nippon Polyurethane Industry Co., Ltd.) | 10 parts |
| Cyclohexane | 400 parts |
| Methyl ethyl ketone | 250 parts |
| Toluene | 250 parts |

Magnetic films with a large width were obtained in this way and were wound up. The resulting films were cut in a width of ½ inch to give video tapes as shown in Table 1.

TABLE 1

| | $t_2$ (μm) | $W_2$ (%) | $t_1$ (μm) | $W_1$ (%) | $(t_1/W_1)/(t_2/W_2)$ |
|---|---|---|---|---|---|
| Example: | | | | | |
| 1 | 0.3 | 20 | 2.0 | 50 | 2.67 |
| 2 | 0.3 | 30 | 2.0 | 45 | 4.44 |
| 3 | 0.3 | 30 | 2.0 | 40 | 5.00 |
| 4 | 0.3 | 30 | 3.0 | 40 | 7.50 |
| 5 | 0.3 | 35 | 3.0 | 40 | 8.75 |
| 6 | 0.3 | 35 | 3.0 | 35 | 10.00 |
| 7 | 0.3 | 35 | 4.0 | 35 | 13.33 |
| 8 | 0.5 | 30 | 3.0 | 35 | 5.14 |
| 9 | 0.5 | 35 | 3.0 | 35 | 6.00 |
| 10 | 0.7 | 30 | 3.0 | 35 | 3.67 |
| 11 | 0.7 | 35 | 3.0 | 35 | 4.28 |
| 12 | 1.0 | 30 | 3.0 | 35 | 2.57 |
| 13 | 1.0 | 35 | 3.0 | 35 | 3.00 |
| Comparative Example: | | | | | |
| 1 | 0.3 | 20 | 1.0 | 50 | 1.33 |
| 2 | 0.3 | 40 | 3.5 | 30 | 15.56 |
| 3 | 0.3 | 45 | 3.5 | 30 | 17.50 |
| 4 | 1.5 | 30 | 3.0 | 35 | 1.71 |

$t_2$: Coating thickness after dried, of the upper magnetic layer
$t_1$: Coating thickness after dried, of the lower magnetic layer
$W_2$: % by weight of the solid content in the coating solution for the upper magnetic layer
$W_1$: % by weight of the solid content in the coating solution for the lower magnetic layer In respect of these video tapes, the following measurement was made. Results obtained are shown in Table 2 below. The measurement was made in the following way: C/N ratio:

Carrier-to-noise ratio. Noise ratio of reproduction output when recorded using recording signals of a single frequency of 4.5 MHz is measured.

Rubbing noise:

| (Measurement procedure) | |
|---|---|
| Amplifier used: | Manufactured by JVC, or an amplifier of the same rank |
| Drum used: | For use in JVC HR-S700 |
| Head used: | S-VHS |

(i) Reproduction is carried out without the travelling of a tape, and system noise is measured using a spectrum analyzer.

(ii) Reproduction is carried out for 1 minute on a sample tape, and system noise is measured using a spectrum analyzer. (1 Pass)

(iii) Reproduction is carried out 10 times for 1 minute each on a sample tape, and system noise is measured using a spectrum analyzer. (10 Passes)

In all the above (i) to (iii), measurement is carried out under environmental conditions of room temperature of 20°±2° C. and relative humidity of 10±2%, in the state that the top cover of VTR has been detached.

(iv) In respect of the noise level around 9 MHz, values of noise at the 10 passes are read on the basis of system noise (0 dB).

TABLE 2

|  | C/N (dB) 4.5 MHz | Rubbing noise (dB) 10 Passes |
| --- | --- | --- |
| Example |  |  |
| 1 | +2.2 | +3.1 |
| 2 | +2.0 | +2.0 |
| 3 | +2.0 | +1.8 |
| 4 | +1.8 | +1.0 |
| 5 | +1.7 | +0.8 |
| 6 | +1.6 | +0.7 |
| 7 | +1.4 | +0.5 |
| 8 | +2.0 | +1.7 |
| 9 | +1.9 | +1.3 |
| 10 | +2.1 | +2.5 |
| 11 | +2.1 | +2.2 |
| 12 | +2.2 | +3.2 |
| 13 | +2.2 | +2.9 |
| Comparative Example |  |  |
| 1 | +2.3 | +6.5 |
| 2 | 0 | +0.5 |
| 3 | −0.9 | +0.4 |
| 4 | +2.3 | +6.3 |

Figure 3:
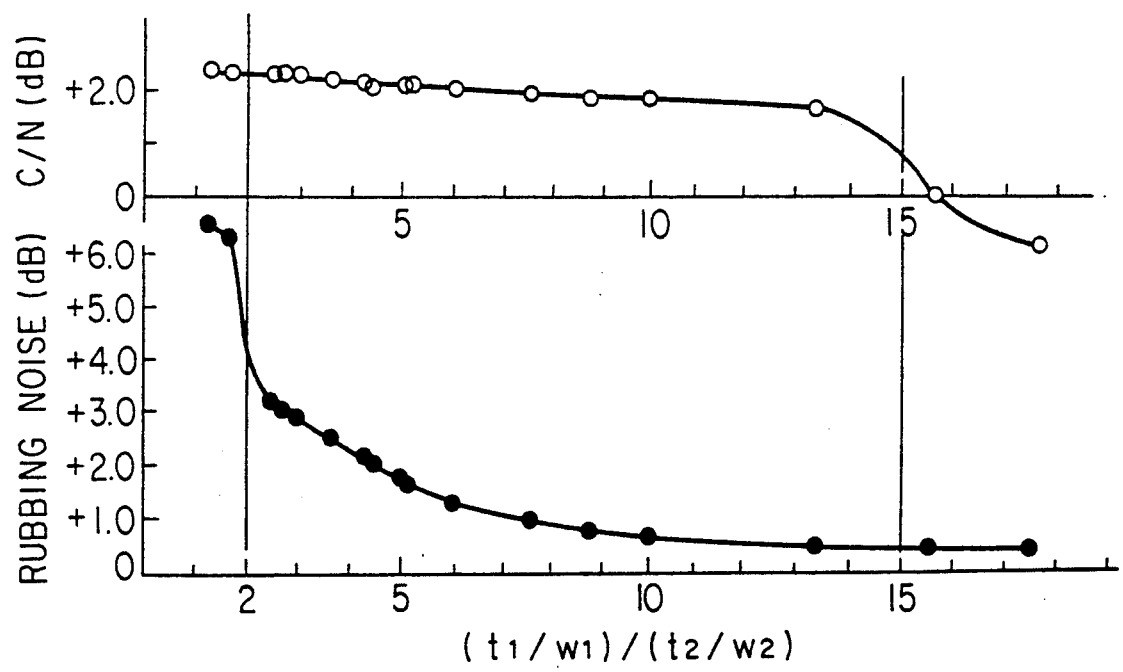
FIG. 3 is a graph to show changes in characteristics, that depend on coating conditions.

The results as shown in FIG. 2 are plotted in FIG. 3.

The mediums with a large C/N ratio and a small rubbing noise can be prepared when the $(t_1/W_1)/(t_2/W_2)$ is in the range of from 2.0 to 15.0, the range according to the present invention (Examples 1 to 13). Points of inflection are seen respectively at the points corresponding to 2.0 and 15.0 in the above ratio. Better results are obtained when the above ratio is set to range from 5.0 to 10.0. On the other hand, the surface of the medium is so smooth that the rubbing noise suddenly increases when the above ratio is less than 2.0 (Comparative Examples 1 and 4), and the C/N ratio is extremely lowered because of the rough surface when the above ratio is more than 15.0 (Comparative Examples 2 and 3).

What is claimed is:

1. A magnetic recording medium comprising a non-magnetic support and, provided thereon, a first magnetic layer coated by a first magnetic coating solution and a second magnetic layer coated by a second magnetic coating solution in this order, wherein a dry thickness of the first magnetic layer, in μm, is represented by $t_1$, a dry thickness of the second magnetic layer, in μm, is represented by $t_2$, the solid content of the first magnetic coating solution, in weight %, is represented by $W_1$, and the solid content of the second magnetic coating solution, in weight %, is represented by $W_2$, and the $t_1$, $t_2$, $W_1$, and $W_2$ have the following relation, $$2.0 \leq (t_1/W_1)/(t_2/W_2) \leq 15.0.$$

2. The medium of claim 1, wherein the relation is as follows:

$$5.0 \leq (t_1/W_1)/(t_2/W_2) \leq 10.0.$$

3. The medium of claim 1, wherein the dry thickness of the first magnetic layer is 1.5 to 4.0 μm.

4. The medium of claim 1, wherein the dry thickness of the second magnetic layer is 0.3 to 1.0 μm.

5. The medium of claim 1, wherein the magnetic layers contain a resin having a hydrophilic polar group.

6. The medium of claim 5, wherein said hydrophilic polar group is selected from the group consisting of —$SO_3M$, —$COOM$ and —$PO(OM')_2$ wherein M represents a hydrogene atom, lithium, potassium or sodium, and M' represents a hydrogene atom, lithium, potassium, sodium or a hydrocarbon group.

7. A method of manufacturing a magnetic recording medium comprising coating onto a non-magnetic support a first magnetic layer by a first magnetic coating solution and coating thereon a second magnetic layer by a second magnetic coating solution, wherein a dry thickness of the first magnetic layer, in μm, is represented by $t_1$, a dry thickness of the second magnetic layer, in μm, is represented by $t_2$, the solid content of the first magnetic coating solution, in weight %, is represented by $W_1$, and the solid content of the second magnetic coating solution, in weight %, is represented by $W_2$, and the $t_1$, $t_2$, $W_1$, and $W_2$ have the following relation, $$2.0 \leq (t_1/W_1)/(t_2/W_2) \leq 15.0.$$

8. The method of claim 7, wherein the relation is as follows:

$$5.0 \leq (t_1/W_1)/(t_2/W_2) \leq 10.0.$$

9. The method of claim 7 wherein the dry thickness of the first magnetic layer is 1.5 to 4.0 μm.

10. The method of claim 7, wherein the dry thickness of the second magnetic layer is 0.3 to 1.0 μm.

11. The method of claim 7, wherein the magnetic layers contain a resin having a hydrophilic polar group.

12. The method of claim 11, wherein said hydrophilic polar group is selected from the group consisting of —$SO_3M$, —$COOM$ and —$PO(OM')_2$ wherein M represents a hydrogene atom, lithium, potassium or sodium, and M' represents a hydrogene atom, lithium, potassium, sodium or a hydrocarbon group.

* * * * *